(12) United States Patent
Schmitz

(10) Patent No.: US 6,843,718 B2
(45) Date of Patent: Jan. 18, 2005

(54) METHOD OF GUIDING EXTERNAL AIR IN A BUILDING SHELL AND A BUILDING; AND A METHOD OF TEMPERATURE CONTROL OF A BUILDING

(76) Inventor: Johannes Schmitz, Kleinfeldchen 12, 52428 Jülich (DE)

( * ) Notice: Subject to any disclaimer, the term of this patent is extended or adjusted under 35 U.S.C. 154(b) by 0 days.

(21) Appl. No.: 10/404,509

(22) Filed: Apr. 1, 2003

(65) Prior Publication Data

US 2004/0209567 A1 Oct. 21, 2004

Related U.S. Application Data

(60) Provisional application No. 60/278,597, filed on Mar. 26, 2001.

(51) Int. Cl.[7] .............................................. F24F 7/007
(52) U.S. Cl. ..................... 454/186; 454/251; 454/252
(58) Field of Search .............................. 454/186, 185, 454/239, 251, 252, 253; 165/210, 909

(56) References Cited

U.S. PATENT DOCUMENTS

| | | | | |
|---|---|---|---|---|
| 4,372,373 A | * | 2/1983 | Haugeneder et al. | 165/54 |
| 4,441,484 A | * | 4/1984 | Greiner | 126/630 |
| 4,578,912 A | * | 4/1986 | Ericsson | 52/169.5 |
| 4,580,487 A | * | 4/1986 | Sosnowski | 454/186 |
| 4,741,391 A | * | 5/1988 | Schmitz | 165/56 |
| 5,954,046 A | * | 9/1999 | Wegler | 126/617 |
| 6,319,115 B1 | * | 11/2001 | Shingaki | 454/186 |

FOREIGN PATENT DOCUMENTS

| | | | | |
|---|---|---|---|---|
| DE | 2359196 A1 | * | 6/1975 | |
| DE | 127953 | | 12/1976 | |
| DE | 31 03 549 | | 11/1982 | |
| DE | 29 15 494 | | 11/1983 | |
| DE | 3311152 A1 | * | 9/1984 | .............. F24J/3/02 |
| DE | 34 41 597 | | 4/1986 | |
| DE | 198 49 127 | | 4/2000 | |
| DE | 10060309 A1 | * | 7/2001 | .............. F24F/5/00 |
| DE | 10144148 A1 | * | 4/2003 | .......... H01L/31/052 |
| EP | 0 236 704 | | 9/1987 | |
| EP | 0 115 014 | | 4/1988 | |
| EP | 479308 A2 | * | 4/1992 | .............. E04B/1/70 |
| FR | 1.152.129 | | 2/1958 | |
| JP | 2001065074 | | 3/2001 | |
| WO | WO 97/21962 | | 6/1997 | |

* cited by examiner

*Primary Examiner*—Jiping Lu
(74) *Attorney, Agent, or Firm*—Henry M. Feiereisen; Ursula B. Day

(57) ABSTRACT

In order to heat external air in a building shell and/or in a building more effectively, the present invention suggests a method for guiding external air in a building shell and in a building, an inner gap being separated from an outer gap by a permeable layer in the region of the building shell. The external air enters the outer gap, the external air reaching an inner gap through the permeable layer and their rising into an upper region of the building shell and/or at least partially sinking into a lower region of the building shell, the external air which has sunken into the lower region of the building shell being guided into the roof region of the building before it is then supplied to a heat pump.

21 Claims, 1 Drawing Sheet

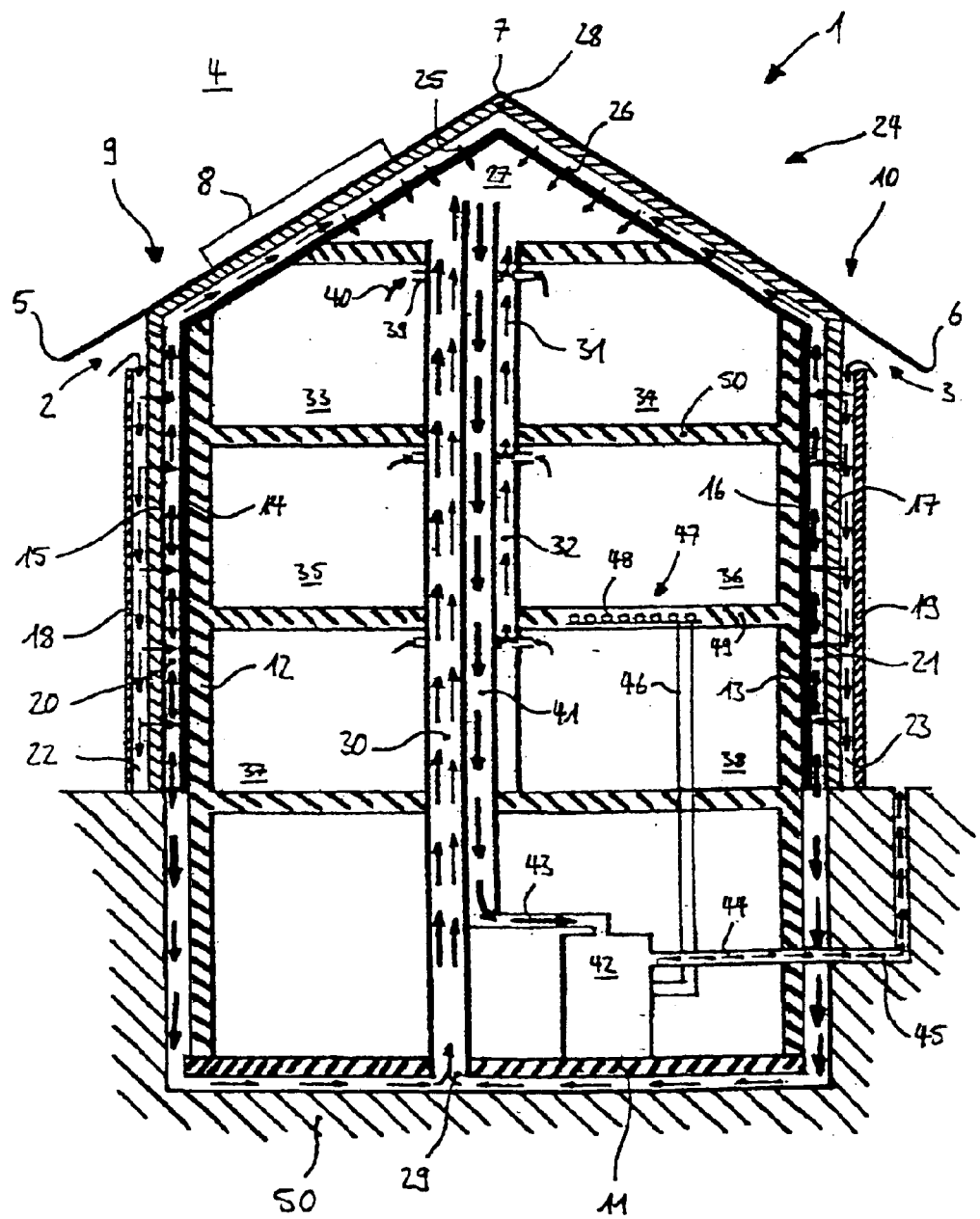

METHOD OF GUIDING EXTERNAL AIR IN A BUILDING SHELL AND A BUILDING; AND A METHOD OF TEMPERATURE CONTROL OF A BUILDING

CROSS-REFERENCES TO RELATED APPLICATIONS

This application relates to the prior filed provisional application, Appl. No. 60/278,597, filed Mar. 26, 2001, the subject matter of which is incorporated herein by reference

BACKGROUND OF THE INVENTION

The present invention relates to a method of guiding external air and in particular, guiding external air in a building shell and in a building as well as a method of temperature control of a building.

In order to guide external air in a building shell or in a building, multiple technical solutions have been suggested up to this point. For example, guiding of external air which is conveyed via multiple gaps between a building wall and a facade and/or between roof boarding and roof covering of the building is described in German Published Application 31 03 549 A1. In this case, the external air is suctioned from near the ground from below using a fan and supplied to an evaporator in the roof region.

However, as may be inferred from the description of this Published Application, the external air is only provided with a limited potential of the heat energy of the building, in particular the building shell of the building. Due to the relatively short time of contact of the external air with the building, which is restricted by the building height, among other things, the external air is also only heated in the course of this contact period. Further heating of the external air through more extensive guiding is not provided in this case. Instead, the external air, which has been heated in a restricted way, is supplied directly to an evaporator of a heat pump and cooled.

There are also multiple examples of methods in which the external air is suctioned from below. It is disadvantageous in this case that the external air only uses the height of the building one single time and therefore also only uses the potential heat radiation of the building only once. The heat absorption of the external air is restricted in this case to only the path from the floor region up to the roof and/or up to the rooftop.

A refinement of the method of guiding external air in a building described above is described in European Patent Application 0 236 704 A2. In this case, the building shell of the building has an outer gap and an inner gap. External air enters the outer gap from an upper region and penetrates into the inner gap through a thermal insulation layer which delimits the outer gap and the inner gap. The inner gap is actively kept under a partial vacuum in this case, the warm air being suctioned downward. For this type of external air guiding as well, it is unavoidable that, in the event of longer-lasting cold periods, the external air must be additionally heated by a heating device before it may be supplied to a heat exchanger of a heat pump.

It would therefore be desirable and advantageous to provide an improved method for guiding air and controlling temperature to obviate prior art shortcomings and to refine the guiding of external air in a building and/or in a building shell in such a way that the external air is more effectively heated.

SUMMARY OF THE INVENTION

According to one aspect of the present invention, the method of guiding external air in a building shell and in a building, includes an inner gap being separated from an outer gap by a permeable layer in the region of the building shell, and external air entering the outer gap, the external air reaching the inner gap through the permeable layer and rising there into an upper region of the building shell and/or at least partially sinking into a lower region of the building shell.

In a further asect of the invention, the method includes an inner gap being separated from an outer gap by a permeable layer in the region of the building shell and external air entering into the outer gap. In this case, the external air reaches the inner gap, in which it rises into an upper region of the building shell and/or at least partially sinks into a lower region of the building shell, through the permeable layer, air which has sunk into the lower region being guided into the roof region of the building before it is then supplied to a heat pump.

It is particularly advantageous if the inner gap runs inside thermal insulation. The thermal insulation is advantageously implemented as a double-wall insulation element, which particularly represents a thermal insulator-heat exchanger. The thermal insulator-heat exchanger has an air gap between two insulation elements. In this case, the air, preferably the external air, absorbs transmitted heat from the thermal insulation. It is favorable if the external air is not directly in contact with a wall of the building, so that no heat is withdrawn from the external air by the wall. The thermal insulator-heat exchanger is preferably used along the building shell.

By means of the inner gap, the external air reaches favorable regions, in which the external air is advantageously heated. For example, the external air is heated by absorbing transmitted heat from the thermal insulating material.

To increase the temperature, the low volume-specific heat capacity of the gas phase of the external air in comparison to the higher volume-specific heat capacity of the thermal insulator-heat exchanger material is also used. According to the present invention, this fact is also used for heat reclamation for a temperature control system of the building.

In this case, a building shell is understood to mean all regions enclosing the building, such as the roof, the outer walls, including the outer walls located in the ground, and the foundation of the building.

Surprisingly, it has been found that through guiding of this type the external air is heated in such a way that the external air does not additionally have to be heated by a heating device, even in the event of longer-lasting cold periods, in order to reach a temperature level high enough that a heat pump may be advisably operated.

Therefore, the operation of a heat pump using only regenerative energies is possible for the first time. The method according to the present invention for guiding external air allows monovalent operation of a heat pump in a building for the first time.

It is advantageous in this case that the external air guided through the lower region of the building into the upper region of the building covers much more than twice the path through the building than the external air guided directly into the roof region through the inner gap.

Through the guiding according to the present invention, the external air is heated in such a way that it now has sufficient energy to be supplied to a heat pump, for example, without being brought to a higher energetic level using a further heating device.

A further great advantage is that the external air which has reached the roof region may be set into motion without a fan or pump or another device which is capable of accelerating air. According to the present invention, the flow of external air through the building shell and through the building is self-regulating.

It is particularly advantageous that the heated external air in the region of the roof, which is particularly enriched under the roof ridge, is continuously and perpetually heated on its path through the building shell which it has flowed through up to this point and its path through the building which it has flowed throughout this point. In this case, the external air guided in this way has preferably not dissipated heat energy in any of the phases, but rather has continuously absorbed heat energy. An ever progressing increase of the energy level of the external air thus occurs. Heat energy is first dissipated through a heat exchanger of the heat pump.

It is not only possible in this case for the heat pump for obtaining heat energy for a building to be operated using the heated external air, but rather it is also possible for electrical energy to be obtained from the energy of the external air.

Furthermore, it is advantageous if the external air introduced is, for example, guided under a roof slope of the building. In this case, the roof slope absorbs an especially large quantity of solar energy all day due to its advantageous angle in relation to the sun, particularly when the roof slope is positioned on the south side, so that the external air flowing along it is heated especially advantageously. In order to exploit the insolation significantly better, it is advantageous if solar collectors are positioned on the roof slope. The external air may be additionally or exclusively heated with their aid. An especially light-permeable outer skin of the roof in the region of the guiding of the external air may also have an advantageous effect on its heating. For example, the outer skin of the roof may be implemented by a transparent thermal insulator, so that a large amount of solar radiation penetrates through the outer skin, but only a small amount of solar energy escapes again, through reflection, for example.

The guiding of the external air along the building shell in the region of the outer wall, in particular in the inner gap, which runs inside the thermal insulation layer of the building shell of the building, also has a positive effect on the heating of the external air. It is especially advantageous in this case if the transmitted heat of the wall and the thermal insulation layer is absorbed directly by the external air flowing through the inner gap and is thus not dissipated unused to the environment. The transmitted heat from the inside of the building allows the external air flowing in the thermal insulation layer to be well heated.

It is obvious that the entire outer wall region of the building or only a part of the outer wall region may be used as an area which the external air flows through, the external air able to be guided through channels in the building shell, for example.

It is also obvious that the external air may even be guided only through areas of the building shell which are especially rich in solar energy, if this leads to a more positive heat balance. This is controlled through the flow speed of the external air and/or through the diameter of the flow channels, for example.

It is advantageous if the volume of the external air to be heated is selected in such a way that sufficient heat is absorbed from the enclosed space which the external air flows through during the flow period.

It is possible for the flow speed and the air volume of the external air to be set and controlled through appropriate adjustment mechanisms, so that, for example, areas of the building shell which are intensively heated by the insolation preferably have external air flowing through them while, for example, areas of the building shell on the shaded side have less external air flowing through them and/or temporarily none at all. Through such guiding of the external air through the building shell, the heat balance of the external air may be significantly improved. In this case, the building shell is, for example, provided with sensors which determine the individual temperature levels of the areas and conduct the external air through the building shell accordingly. It is obvious that the air guiding may be automatically adjusted in accordance with the values determined.

It is also suggested according to the present invention that the external air which has risen into the upper region of the building shell enters an upper region of the roof of the building, preferably in a region directly under the roof ridge, from the inner gap. The heated external air advantageously enters this region from the inner gap of the building shell via structural gaps and/or via constructed openings.

In a further embodiment variation, a part of the external air is guided through the masses of the cellar outer walls and through the ground, preferably through the ground under the building foundation. It is particularly advantageous in this case if the massive masses of the building are used to heat the external air. The part of the external air which does not have sufficient buoyancy to rise into the upper region of the building shell in the inner gap of the thermal insulator-heat exchanger due to insufficient temperature is advantageously guided through the masses of the cellar outer walls and through the ground under the building foundation. This part of the external air thus now receives the possibility of absorbing heat from the masses of the cellar outer walls and the ground.

Since the ground also represents an outstanding heat accumulator, not only are the building shell lying above and below the earth and the building masses of the building used to heat the external air, as described above, but also the ground enclosing the building, particularly even the ground under the cellar floor.

Since the mass of the building particularly represents an outstanding heat accumulator, it is especially advantageous to guide at least a part of the external air through this heat accumulator, so that the external air is supplied with further heat energy.

Particularly in old buildings, it is advantageous if at least a part of the external air is guided through the cellar rooms. In the reconstruction of old buildings, for example, the problem often arises that the pipes necessary for the method according to the present invention for guiding the external air through the cellar outer walls and for guiding under the cellar floor may typically be installed not at all or only at a very high cost. In order to avoid the enormous costs of such an insulation, it is then favorable to guide the external air through the cellar rooms according to the present invention. It is advantageous if, for better insulation of the cellar rooms, the cellar ceilings are insulated, preferably using a thermal insulation layer. The external air may then particularly also be guided in a gap between the cellar ceiling and the thermal insulation layer. If it is necessary, it is advantageous if the external air which is guided through the cellar rooms is conducted through a heat exchanger. This is preferably an air-water heat exchanger and is positioned, for example, in a condenser-side loop of the heat pump. Using this heat exchanger, for example, unused residual heat from a water loop of a temperature control system of the building is transferred to the external air guided through the cellar rooms.

It is advantageous in this case if the heat which may not be used further by the temperature control system of the building is supplied to the external air, so that the external air is heated further in this way.

It is obvious that the guiding of air through the cellar rooms of the building described above is not only restricted to old buildings. Rather, this type of air guiding is to be used additionally or even exclusively in any building.

It is typically advantageous if the external air guided through the cellar rooms is guided into rooms of the building, preferably into aboveground rooms of the building. Through external air guiding of this type, additional fresh, but heated external air reaches the individual rooms of the building. This external air contributes significantly to improvement of the room climate, among other things. If, for example, direct supply of the heated external air for air heating is not immediately necessary, i.e., the room is already sufficiently heated, it is possible to guide the external air guided through the cellar rooms and the heat exchanger of the temperature control system directly into the upper region of the building. The external air may mix further with other heated air here.

It is obvious that this type of air guiding is also advantageous in a newly constructed building. Depending on the application, it is expedient to guide external air through the cellar rooms not only in reconstructed old buildings, but also in new buildings. For example, in a new building, to increase the proportion of fresh air in the individual rooms of the building, a part of the external air to be heated may be guided in the way described above through the cellar rooms and may be additionally heated using the heat exchanger.

It is also possible for the external air guided via the cellar rooms of the building to be used exclusively for room ventilation, for example, in which not heating of room air, but rather improvement of the room air quality, is primarily to be achieved. This also relates to any type of building, particularly new buildings and/or old buildings.

It is advantageous if the part of the external air which was guided through the ground is recombined in a region. By partially splitting off the external air flowing through the lower region of the building shell, the masses of the outer walls of the building are advantageously used as a good heat accumulator for heating the external air. It is also possible that, depending on application, the external air to be heated is guided only through the ground and/or only through the boundary region ground/building shell or only through the masses of the cellar walls and/or through the masses of the cellar floor.

For example, the external air to be heated may be guided down to the cellar floor and/or underneath the cellar floor and subsequently also may additionally be guided through the masses of the cellar floor and/or through the masses of the cellar walls.

The region in which the part of the external air which was guided through the cellar masses and through the ground is combined is advantageously near the cellar floor.

In this region, the external air may either be collected and heated further, so that the most strongly heated air may gradually rise upward, through a shaft, for example, or the recombined external air may rise directly into the upper region of the building after being recombined, without collecting.

An especially preferable variant of the method provides that the external air guided from the lower region of the building shell into the upper region of the building is mixed in the roof region of the building with the external air which has risen in the inner gap of the building shell. The external air which has reached the cellar region is guided, for example, through a shaft located inside the building, preferably up to the roof ridge region of the building. At the same time, the rising external air is heated further through the heat energy stored inside the building.

The method according to the present invention surprisingly allows guiding of heated external air in such a way that the heated external air moves automatically in the building shell without being moved by a fan or pump, for example. With typical guiding of external air, the heated external air only moves sufficiently and in the desired way when it is additionally driven using a fan or pump.

A further variant of the method provides that exhaust air from the rooms of the building is guided into the roof region, particularly in the roof ridge region. The exhaust air is removed from heated rooms through appropriate openings, for example, and is preferably guided into the roof region of the building using a central exhaust air channel. In this case the rooms are accordingly heated, for example, through a heating system of the building and/or through the dissipated heat of the occupants and/or through the solar energy which is incident through the windows and/or through the doors of the building, for example. In particular, the external air supplied to the rooms of the building through the cellar rooms and the heat exchanger is also guided into the roof region of the building as exhaust air.

In order to intensify the flow of exhaust air out of the individual rooms, it may be expedient to position a fan, for example, in the region of the central exhaust air channel, which advantageously accelerates the exhaust air out of the rooms of the building.

The fan is, for example, also outstandingly suitable for ventilating the rooms, even if the removal of waste heat from the rooms is not a primary consideration.

It is especially advantageous if the exhaust air removed from at least one room of the building is mixed in the roof region of the building with the external air which has risen upward in the inner gap and/or with the external air guided from the lower region of the building shell into the upper region of the building. The external air experiences a further increase in temperature through the added exhaust air from the rooms of the building. This is preferably performed in the roof ridge region of the roof, in which, for example, both channels, i.e., the external air shaft from the cellar region and the central exhaust air channel, are guided together in one space.

If it is desired or technically necessary, the heated external air and the exhaust air may also have fresh external air added to them through a further opening, which is preferably positioned in the roof region. This external air has preferably not been previously guided through the building shell and/or through the inside of the building.

The mixed air, comprising the heated external air from the inner gap and from the cellar region and the exhaust air from the rooms of the building, may be collected in the roof ridge region and retrieved from there as necessary. It is preferably relayed directly.

A supplementary variant of the method provides that the mixed air is suctioned out of the roof region by a heat pump on the evaporator side. In this way, because the heated external air is suctioned directly out of the roof region by the heat pump, an additional suction device which supplies the heated air to the heat pump is no longer necessary. Rather, the heat pump draws sufficient heated air for heating out of this reservoir as needed, so that the heat pump is ready for use at any time.

It is especially advantageous if 70%, preferably more than 90% of the air to be cooled by the heat pump is composed of the external air guided through the building shell. The heat pump is preferably positioned in the cellar region of the building in this case, so that the external air, preferably enriched with exhaust air, passes through the inside of the building once more, so that it may experience a further temperature increase. For this purpose, the air is suctioned by a fan or pump of the heat pump, for example. The external air and/or exhaust air supplied to the heat pump is cooled using a heat exchanger, so that a coolant of the heat pump is evaporated for this purpose, for example.

In an especially preferred variant of the method, the air cooled in this way is preferably guided completely out of the building. It is especially advantageous if the air cooled by the heat pump is removed completely from the evaporator-side air loop which flows through the building shell and/or the building. Until now, at least part of the cooled air was returned to this air loop in order to resupply the air, which still had residual energy, at least partially to the building, which is enclosed by an air envelope, in especially adverse environmental conditions, for example. In this case, the previously heated air was only cooled enough that return of the cooled air into the air loop was advisable.

It is obvious that, depending on the application, even previously cooled air may be returned into parts of the building and the cooled air does not absolutely have to be guided out of the inside of the building.

Even in the event of long-lasting cold periods, it is possible to conduct the previously heated external air and the exhaust air completely out of the building as cooled air.

It is obvious that the heat energy withdrawn from the heated air is energetically enhanced. For this purpose, the heat energy withdrawn from the heated air is supplied to a temperature control system having the largest possible area, among other things, in particular a temperature control system made of pipes, which are preferably positioned in the floors and ceilings of the building. It is especially advantageous in this case if the ratio selected of the surface of the pipes to the volume of the pipes is as large as possible.

The object is also achieved by a building having a heat pump, the heat pump having an opening to receive heated external air on the evaporator side, and the evaporator-side opening being positioned near a mixing region, this mixing region being positioned in the roof region of the building. A building constructed in this way allows insufficiently warm external air to be guided in the longest possible path through the building shell and/or through the building. It is advantageous in this case that no separate fan or pump must be used to move the external air as it is guided, which in turn has a positive effect on the energy balance of the building. Through the guiding according to the present invention, the external air absorbs an especially large amount of heat energy, through which the efficiency of an energy storage house, in particular the heat pump of an energy storage house, is increased, for example.

It is suggested according to the present invention that it is advantageous if the heat pump is positioned in the cellar region of the building. In this way, the air to be supplied to the heat pump flows through the building from top to bottom once again.

The use of a heat pump in a building having a building shell works especially advantageously for cooling external air, the heat pump being supplied with the external air from the roof region of the building. Just the use of a heat pump in a building having guiding of the external air according to the present invention is especially advantageous, since the external air is supplied an unusually high proportion of heat energy, without heat energy having to be added to the external air from an electrical heat source or a heat source powered by a fossil fuel. Among other things, this allows the heat pump to operate even more efficiently than in typical energy storage buildings.

The object upon which the present invention is based is additionally achieved by a method for temperature control of a building using a temperature control system which comprises a pipe network which preferably comprises pipes having a low inner diameter, through which a liquid, preferably water, is guided, and a heat pump, preferably an air-water heat pump, the air supplied to the heat pump being guided according to one of claims 1 to 12. Surprisingly, it has been found that, using the method according to the present invention for external air guiding in combination with the temperature control system described, it is possible to keep the temperature difference between the evaporator side and the condenser side of a heat pump sufficiently low that the energy of the heated external air is sufficient to heat a temperature control system connected to the condenser side of the heat pump enough that the building, in particular the room air of the building, is sufficiently heated in this way.

In this way, it is possible, among other things, to control the temperature of the building without a conventional heating device having to be used in addition for this purpose. The heating of water for domestic use is also included in this case.

It is especially advantageous that the temperature control method is not only capable of heating a building, but rather, particularly in summer, preferably during the night, is also capable of cooling the aboveground part of the building. Through the temperature control method, a building is heated in an especially energy-saving way and also cooled in an especially energy-saving way as needed.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic section of an enegry storage house according to the present invention;

DETAILED DESCRIPTION OF PREFERRED EMBODIMENTS

Throughout all the Figures, same or corresponding elements are generally indicated by same reference numerals.

Turning now to the drawing, and in particular to FIG. 1, there is shown a building 1, external air 4 is introduced through the openings 2 and 3 under the roof surfaces 5 and 6 of a roof 7 into a building shell. A solar collector 8 is also positioned on the roof surface 5 of the roof 7.

In this case, the building shell comprises walls 9 and 10, a cellar floor 11, and the roof 7. The walls 9 and/or 10 each comprise an inner wall 12 and/or 13, a thermal insulator-heat exchanger, each of which has two delimiting thermal insulation layers 14 and/or 15 and 16 and/or 17, as well as a facade 18 and/or 19. In this case, the thermal insulator-heat exchangers each have an inner gap 20 and 21 between the delimiting thermal insulation layers 14 and 15 and 16 and 17. An outer gap 22 and/or 23 is provided between the respective thermal insulation layer 15 and/or 17 of the thermal insulator-heat exchanger and the corresponding outer facade 18 and/or 19. The outer gaps 22 and 23 are each open in their upper region and closed in their lower region.

The external air 4 enters the outer gaps 22 and 23 via the openings 2 and 3. The external air 4 present in the outer gaps 22 and 23 traverses the thermal insulation layers 15 and 17 in a horizontal direction, so that it reaches the inner gap 20 and/or 21. In this case, first transmitted heat of the building 1 is supplied to the external air 4. The external air 4 which thus reaches the inner gap 20 and/or the inner gap 21 rises or sinks, depending on the temperature level, in the inner gap 20 and/or 21 into the roof region or into the cellar region of the building 1. In this case, the external air 4 is continuously heated by absorbing further transmitted heat from the building 1.

If the external air 4 is sufficiently warm in the inner gaps 20 and 21 after penetrating the thermal insulation layer 15 and/or 17, it rises up to an upper region 24 of the building shell. The external air 4 reaches a mixing region 27 there, which is positioned directly under the roof ridge 28, in the direction of the arrows 25 and 26 via structural gaps and/or via appropriately placed openings.

On the way along the roof surface 5 into the roof region 24, the external air 4 is additionally heated by a solar collector 8.

External air 4 which is located in the inner gaps 20 and 21 and does not have a sufficient heat level immediately after penetrating the thermal insulation layers 15 and 17 to rise into the upper region 24 of the roof 7 sinks into the cellar region of the building 1 in the inner gaps 20 and 21. In this case, the external air 4 is guided into the ground 50 using pipes inside the walls 9 and/or 10 of the building 1 and under the cellar floor 11.

In this way, the external air 4 is heated further. The external air 4 guided in this way collects in the region 29. In the region 29, the external air 4 is heated in such a way that it rises upward due to its thermodynamic buoyancy. In this case, the external air 4 is guided through a shaft 30 which is positioned inside the building. The external air 4 rises through the shaft 30 up to the mixing region 27 of the building 1. The external air 4 which has risen into the mixing region 27 is now enriched by exhaust air 31. The exhaust air 31 is removed for this purpose by a central exhaust air channel 32 from the heated rooms 33, 34, 35, 36, 37, and 38 of the building 1. For this purpose, the room 33 (as an example for all rooms 34 to 38) has a channel 39 which leads to the central exhaust air channel 32, through which the exhaust air 40 of the room 33 flows. The external air 4 enriched by the exhaust air 31 is now guided through a further shaft 41 to the heat pump 42. For this purpose, the heat pump 42 has a fan, which suctions the external air 4 from the mixing region 27 under the roof ridge 28 to the shaft 41. In this case, the heat energy of the suctioned air 43 is dissipated to a coolant using an evaporator of the heat pump 42, through which the air 43 is cooled. The cooled air 43 is guided through a channel 45 out of the building 1. The heat produced using the heat pump is supplied to a temperature control system 46 of the building 1 in this case. In this case, the temperature control system 46 comprises a large-area pipe network 47, which in turn comprises individual pipes 48 positioned in the floor 49 and/or the ceiling 50. For this purpose, the pipes 48 have the greatest possible ratio of surface to volume. The large-area pipe network 47 of the temperature control system 46 is to be used both for heat dissipation and for heat absorption.

The energy generated using the heat pump 42 is also used for heating water for domestic use.

Through the method according to the present invention, monovalent energy operation of the building 1 is possible.

While the invention has been illustrated and described as embodied in a method to guide external air in a building shell and a building, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of guiding external air in a building shell and in a building comprising, an inner gap being separated from an outer gap in the region of the building shell by a permeable layer and external air entering the outer gap the external air reaching the inner gap through the permeable layer and rising there into an upper region of the building shell and/or at least partially sinking into a lower region of the building shell, wherein the external air which has sunk into the lower region is guided into the roof region of the building before it is then supplied to a heat pump.

2. The method according to claim 1, wherein the external air which has risen into the upper region of the building shell passes out of the inner gap into an upper region of the roof of the building.

3. The method according to claim 2, wherein the external air passes out of the inner gap into an upper region directly below the roof ridge of the roof.

4. The method according to claim 1, wherein a part of the external air is guided through the mass of the cellar outer walls and through ground.

5. The method according to claim 4, wherein a part of the external air is guided through the masses of the cellar outer walls and through the ground under the building foundation.

6. The method according to claim 1, wherein the external air is guided through cellar rooms of the building.

7. The method according to claim 6, wherein the external air guided through the cellar rooms is guided into rooms of the building.

8. The method according to claim 7, wherein the external air guided through the cellar rooms is guided into above-ground rooms of the building.

9. The method according to claim 1, wherein the part of the external air which is guided through ground is recombined in a region.

10. The method according to claim 1, wherein the external air guided out of the lower region of the building shell into the upper region of the building is mixed in the roof region of the building with the external air which has risen in the inner gap of the building shell.

11. The method according to claim 1, wherein exhaust air is guided out of rooms of the building into the roof region and into the roof ridge region of the roof.

12. The method according to claim 1, wherein the exhaust air conducted out of at least one room of the building is mixed in the roof region with the external air which has risen in the inner gap and/or with the external air guided out of the lower region of the building shell into the upper region of the building.

13. The method according to claim 1, wherein the mixed air is suctioned on an evaporator side by a heat pump out of the roof region.

14. The method according to claim 1, wherein 70% of the air to be cooled by the heat pump is composed of external air guided through the building shell.

15. The method according to claim 14, wherein more than 80%, of the air to be cooled by the heat pump is composed of external air guided through the building shell.

16. The method according to claim 1, wherein cooled air is guided completely out of the building.

17. A method according to claim 1 wherein the external air guiding is used in summer for cooling the aboveground part of the building.

18. A method according to claim 17, wherein the external air guiding is used in summer during the night.

19. The method for temperature control of a building having a temperature control system, which comprises a pipe network, which comprises pipes having a small inner diameter, through which a liquid is guided, and having a heat pump, the heat pump being supplied with air wherein the air supplied to the heat pump is guided according to claim 1.

20. The method of claim 19, wherein the liquid is water.

21. The method of claim 19, wherein the heat pump is an air-water heat pump.

* * * * *